C. H. HAPGOOD.
STANDARDIZED CONNECTING ROD AND PROCESS OF STANDARDIZING THE SAME.
APPLICATION FILED FEB. 24, 1920.
1,367,478.
Patented Feb. 1, 1921.
3 SHEETS—SHEET 2.
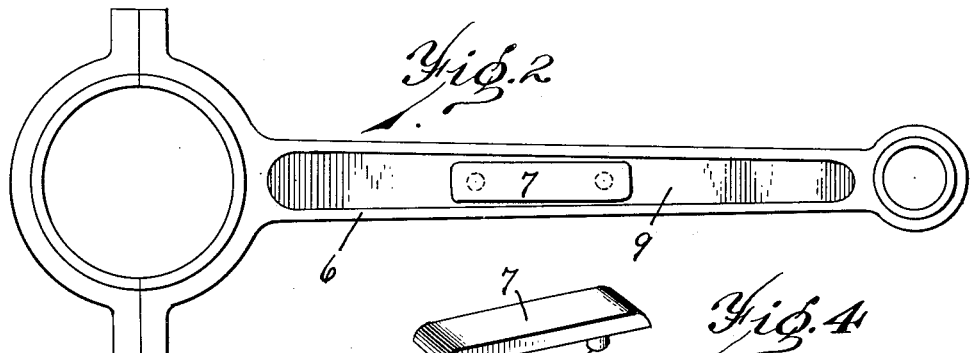
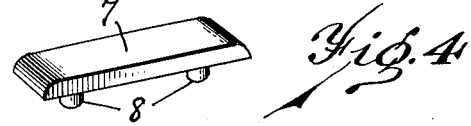
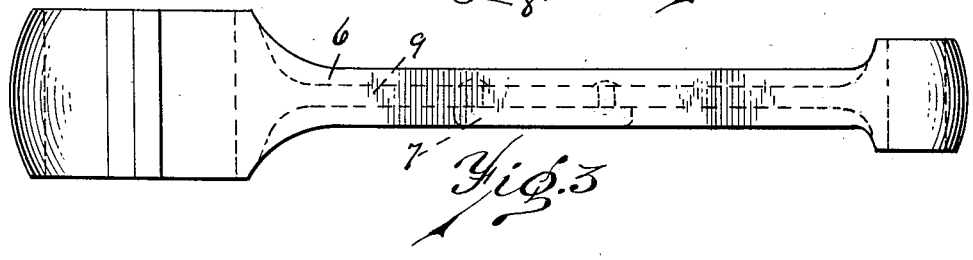
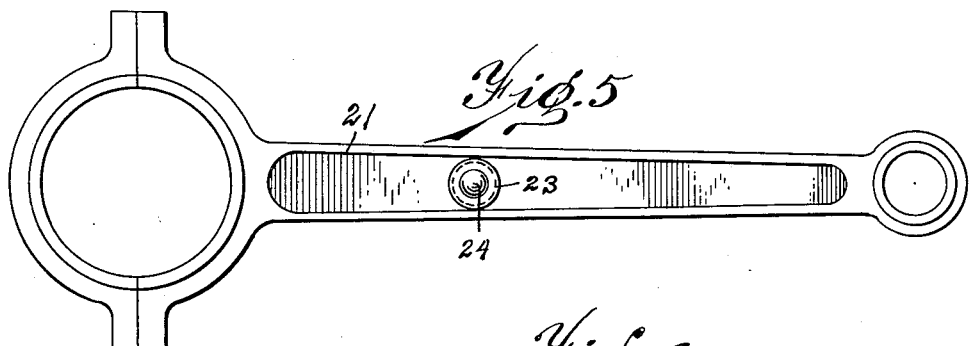
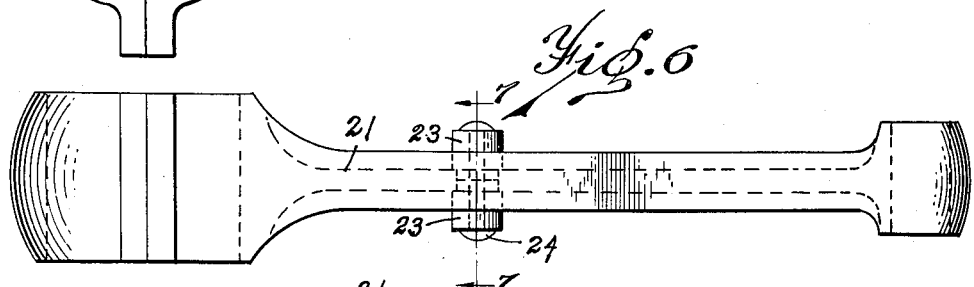
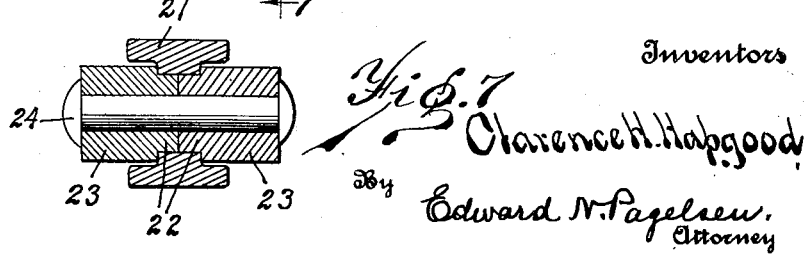

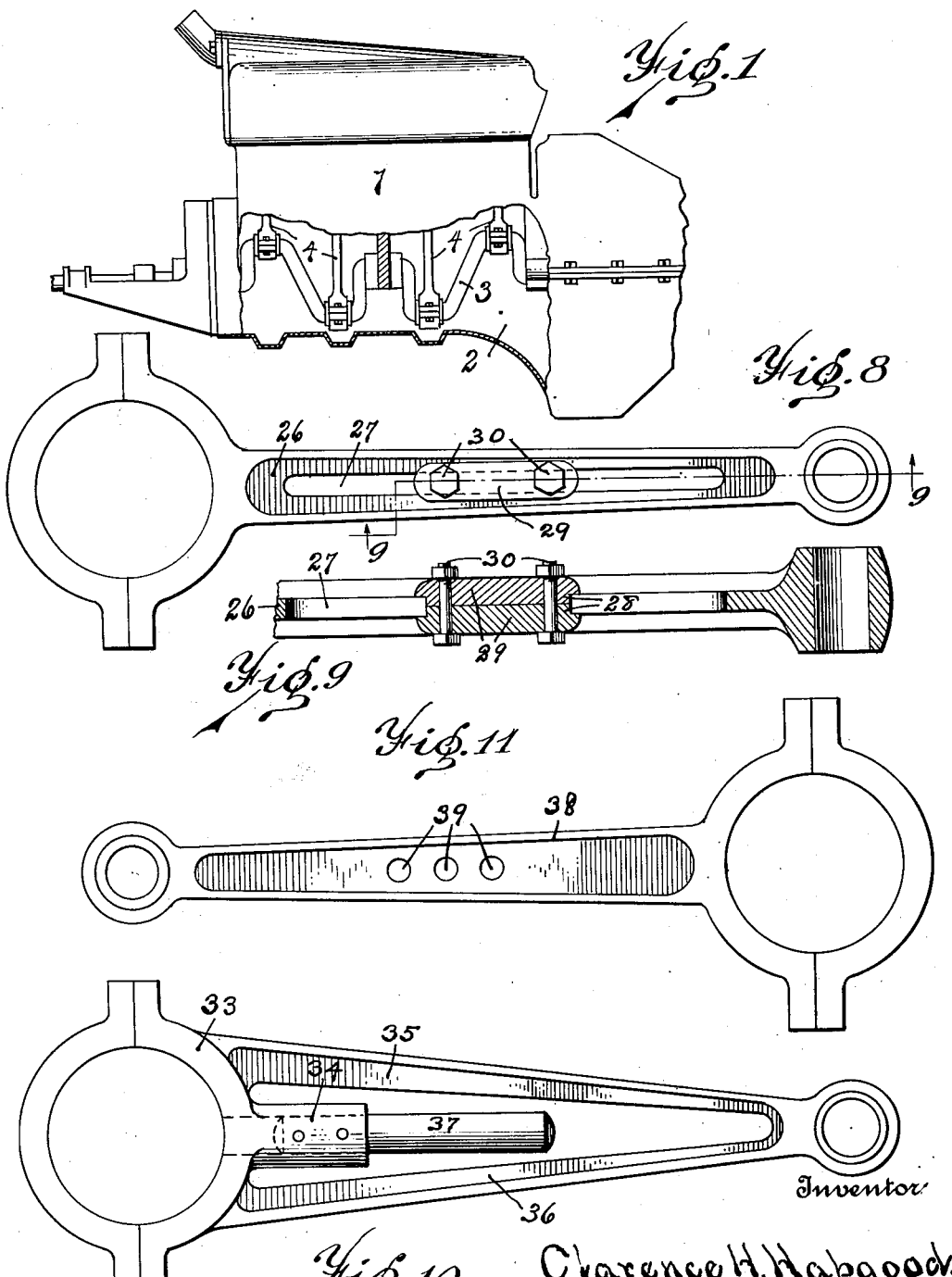

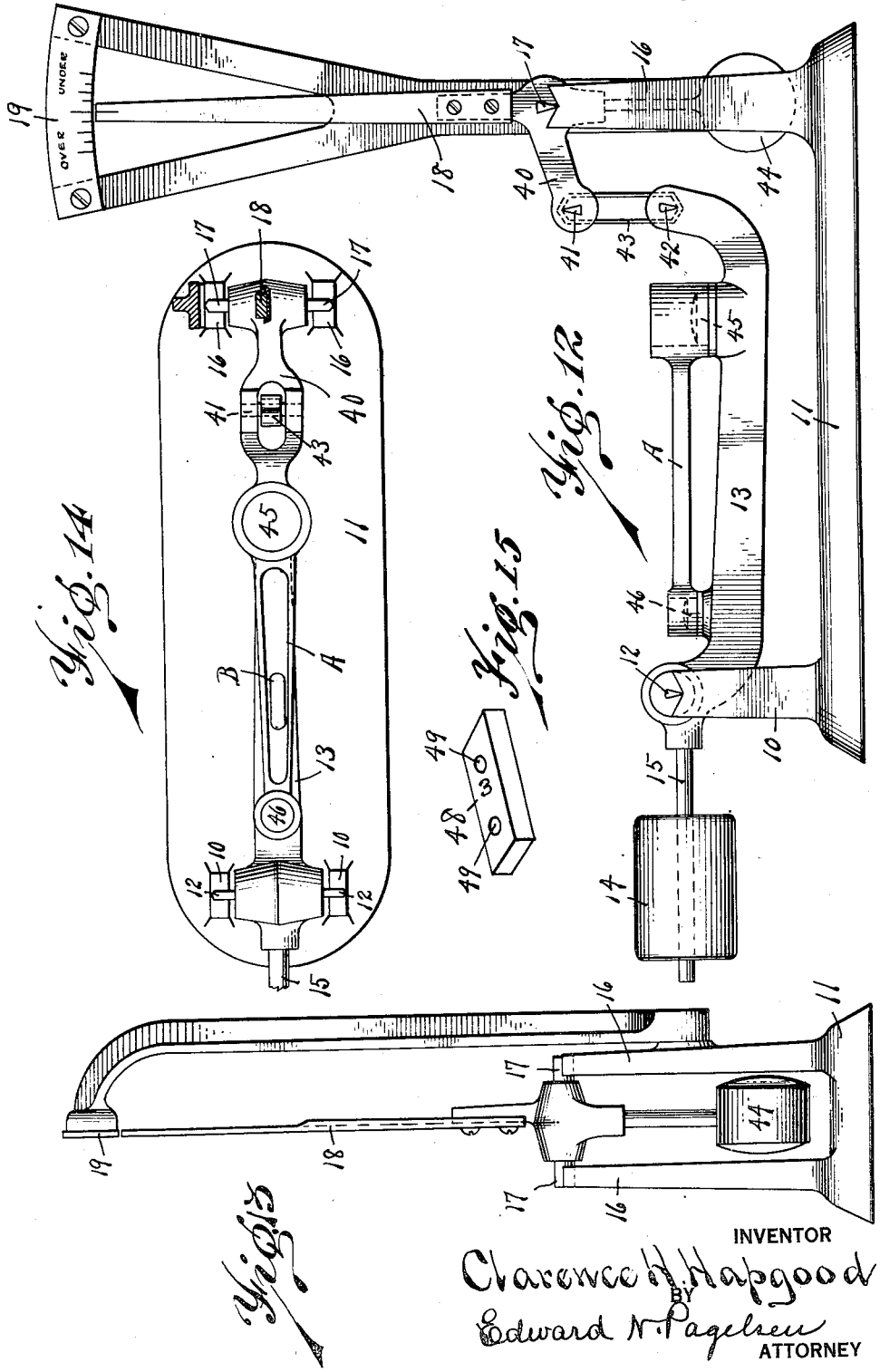

UNITED STATES PATENT OFFICE.

CLARENCE H. HAPGOOD, OF TOLEDO, OHIO, ASSIGNOR OF ONE-HALF TO CHARLES C. HOFFMANN, OF BIRMINGHAM, ALABAMA.

STANDARDIZED CONNECTING-ROD AND PROCESS FOR STANDARDIZING THE SAME.

1,367,478.                Specification of Letters Patent.        Patented Feb. 1, 1921.

Application filed February 24, 1920. Serial No. 361,020.

*To all whom it may concern:*

Be it known that I, CLARENCE H. HAPGOOD, a citizen of the United States, and residing at Toledo, in the county of Lucas and State of Ohio, have invented a new and Improved Standardized Connecting-Rod and Process for Standardizing the Same, of which the following is a specification.

Designers and constructors of high speed engines, particularly of the internal combustion type, have endeavored to eliminate the stresses which result from the crank shafts and the parts attached thereto being out of balance, and to this end have not only counterbalanced the crankshafts but have also attempted to finish the several connecting rods of an engine so that they should be of the same weight. As the metal is of different densities, finishing the entire surfaces of connecting rods does not bring the desired results. The expense has not been warranted because of the fact that, while the connecting rods of any one engine may be of the same weight when the engine is first built, replacements do not correspond, and therefore the engine is out of balance immediately after replacements are made. Furthermore, unless the connecting rods are of identical proportions, density of material, and dimensions throughout, their centers of gravity will not be at the same distances from their crank pin holes.

It is not sufficient to provide an engine with connecting rods of the same weight, but it is most desirable that the center of gravity of each connecting rod shall be at the same distance from the center of its crank pin hole.

The present invention therefore relates to the process of producing connecting rods for high speed engines which shall all have the same weight for all engines of any particular type and all have their centers of gravity at predetermined distances from the two working centers.

This invention consists in the process of producing connecting rods by so attaching a proper counterweight to each connecting rod that the connecting rod will not only have a predetermined weight but that its center of gravity will be a predetermined distance from the center of its crank pin hole.

It further consists in the combination of a plurality of connecting rods with a crank shaft, the connecting rods all having the same weight and all having their centers of gravity the same distance from the centers of the crank pin holes.

In the accompanying drawings, Figure 1 is an elevation of a four cylinder internal combustion engine with a portion of the crank case broken away. Fig. 2 is a side elevation and Fig. 3 is a plan of a connecting rod provided with an attached counterbalancing weight, which weight is shown in Fig. 4. Fig. 5 is an elevation and Fig. 6 is a plan of another connecting rod having a different type of counterbalance. Fig. 7 is a section on the line 7—7 of Fig. 6. Fig. 8 is an elevation of another type of connecting rod and counterbalance, and Fig. 9 is a section on the line 9—9 of Fig. 8. Fig. 10 is an elevation of another type of connecting rod. Fig. 11 is an elevation of another type of connecting rod. Fig. 12 is a side elevation, Fig. 13 is an end elevation, Fig. 14 is a plan of a simple mechanism for determining the center of gravity of the connecting rod, and Fig. 15 is a perspective view of a counterbalance.

Similar reference characters refer to like parts throughout the several views.

In Fig. 1 is shown a cylinder block 1, crank case 2, crankshaft 3, and connecting rods 4 of an internal combustion engine. When this engine runs at high speeds any difference in weight of the connecting rods and any difference in the moments of inertia resulting from unequal distances between their crank pins and their centers of gravity will cause varying twisting stresses in the crankshaft. The principal factor in balancing the high speed engines resides in balancing the crankshafts and the connecting rods attached thereto and in producing such connecting rods of exactly the same weight and furthermore producing these rods with their centers of gravity equal distances from the centers of their crank pin holes.

The working weight of the connecting rods of any particular type of engine is first established, the finished connecting rods are all made to be a little below this working weight. These rods are weighed and the differences between their weights and the established weight are noted, and a small counterweight which equals this difference is secured to or packed with each rod, these counterweights being provided in quantities and varying in weight so that the proper counterweight for each rod may be had at once.

In Figs. 2, 3 and 4 a connecting rod 6 is shown having a small counterweight 7 attached thereto, said counterweight having tenons 8 which are adapted to project through small holes that are drilled through the web 9 of the connecting rod, after which the tenons are riveted or spot welded in place to hold the counterweight in position. The amount of metal which is removed by drilling holes for these tenons is allowed for, so that when these counterweights are attached the several connecting rods will all have the same predetermined weight.

After the connecting rod has been weighed and the counterweight selected to bring the rod up to the predetermined weight, the device shown in Figs. 12, 13 and 14 may be employed to determine the exact position of the counterweight. Small pedestals 10 are mounted on a base 11 and support the knife edges 12 mounted on the lever 13, provided with a counterbalance 14 on a rod 15. The pedestals 16 on the base 11 support the knife edges 17 which carry the pointer 18 whose upper end travels over the scale 19. An arm 40 on this pointer is provided with the knife edge 41, around which, and the knife edge 42 on the lever 13, extends the link 43. A weight 44 normally tends to hold the pointer vertical. On the lever are two accurately formed pins 45 and 46, which accurately fit the crank pin and wrist pin holes of the connecting rod.

The connecting rod is first weighed to determine the counterweight required to bring it up to the pre-determined weight. The connecting rod A is then placed on the lever 13 with the pins 45 and 46 extending into the holes in its ends and the counterweight B is placed on the rod and moved along until the pointer 18 points to the middle graduation of the scale 19. When the pointer 18 swings to the left, the center of gravity of the connecting rod is too far from the pivot 12, and when it swings to the right, the center of gravity is too near to said pivot. But when the hand 18 points to zero, it indicates that the counterweight is at the exact distance necessary to bring the center of gravity the pre-determined distance from the crank pin end of the connecting rod. The mechanism may of course be specially constructed for the connecting rods of each particular type of engine, but as engines are usually made in large quantities, this simple device can be produced for each particular type at a very small expense. Any other desired mechanism to accomplish the purpose may be employed. After the position of the counterweight 7 has been accurately determined, the holes for the tenons 8 are drilled and the ends of the tenons 8 riveted over, or any other desired process may be employed to secure the counterweight to the rod.

In Figs. 5, 6 and 7 a connecting rod 21 is shown with a hole drilled through its web 70 of sufficient size to receive the reduced inner ends 22 of the counterweights 23 which are held in position by a rivet 24. It is obvious that the shape of these counterweights may be varied by any engineer.

In Figs. 8 and 9 the connecting rod 26 is shown with a slot 27 in its web into which slot tongues 28 on the counterweights 29 extend, the counterweights being held in position by means of bolts 30. In this case the counterweights may be accurately secured in position before removing the rods from the testing mechanism shown in Figs. 11 and 12.

In Fig. 10 the connecting rod 33 is shown provided with a sleeve-like portion 34 which extends up into the space between the two sides 35 and 36 of the connecting rod. A small rod 37 constitutes the counterweight and it will be slid longitudinally of the connecting rod within the sleeve 34 until the proper location is found to position the center of gravity at the exact distance from the center of the crank pin hole desired.

In Fig. 11 is shown a connecting rod 38 having small holes 39 drilled at the proper points to remove the metal necessary to reduce the connecting rod to the pre-determined weight and at the same time locate the center of gravity at the proper distance from the crank pin hole. While in all this specification the distance from the crank pin hole has been emphasized, it is to be understood that this is merely for convenience, as this distance subtracted from the working length of the connecting rod fixes the desired distance from the center of gravity to the center of the wrist pin hole.

It is obvious that the form of the connecting rod and the character and shape of the counterweights may be varied within very wide limits without departing from the spirit of my invention as set forth in the following claims, and that the particular mechanism for determining the location of the counterweights necessary to obtain the desired position for the center of gravity may also be of many different constructions. Instead of bolts and rivets the counterweights may be welded or soldered in position.

Instead of using the counterweight itself in connection with the mechanism shown in Figs. 12, 13 and 14, standard properly hardened counterweight-jigs 48 (Fig. 13) may be employed, these varying in weight to bring the connecting rods up to the predetermined weight. Each jig would be properly marked with its weight so that the workman would lose no time in selecting the proper jig. Each jig will have holes 49, and after being moved to the proper position determined by the pointer 18, will be clamped to the connection, whereupon drills will be run down through the holes 49 and through the connecting rod. These holes will be correct for the tenons 8 on the counterweights 7. Or these jigs may be of proper form for the counterweight shown in Fig. 5 so as to determine the exact position of the hole for the reduced ends 22 of the weights 23.

I claim:—

1. The process of producing a connecting rod having a desired predetermined weight and its center of gravity at a predetermined distance from the center of the crank pin hole, which consists in forming the connecting rod below the predetermined weight and then attaching thereto a counterweight of sufficient mass to bring the rod to the desired weight and at such a point that the center of gravity of the rod is at the desired distance from the center of the crank pin hole.

2. The process of producing a series of connecting rods having predetermined equal weights and their centers of gravity at predetermined equal distances from the center of the crank pin holes, which consists in first making the connecting rods below the final predetermined weight, providing a counterweight for each rod sufficiently large to bring the rod to the desired weight and securing the counterweight in such position along the rod between its bearings that the center of gravity of that rod will be the desired distance from the center of the crank pin hole.

3. A set of connecting rods for a high speed engine, each rod consisting of a main portion and a counterweight attached thereto between its bearings, all the rods having the same weight and the centers of gravity of the rods being predetermined distances from their bearings.

4. A connecting rod and a counterweight attached thereto, the combined connecting rod and counterweight having a pre-determined weight and also having its center of gravity a pre-determined distance from the center of the hole in one of its ends, the counterweight being attached to the rod between its bearings.

CLARENCE H. HAPGOOD.